(12) United States Patent
Cheng et al.

(10) Patent No.: US 7,880,818 B2
(45) Date of Patent: Feb. 1, 2011

(54) DEVICE AND METHOD FOR CORRECTING KINESCOPE SCAN DISTORTION

(75) Inventors: Guohua Cheng, Shanghai (CN); Chenliang Wu, Shanghai (CN); Miao Sima, Shanghai (CN)

(73) Assignee: Pixelworks, Inc., San Jose, CA (US)

( * ) Notice: Subject to any disclaimer, the term of this patent is extended or adjusted under 35 U.S.C. 154(b) by 1093 days.

(21) Appl. No.: 11/566,627

(22) Filed: Dec. 4, 2006

(65) Prior Publication Data

US 2007/0204208 A1 Aug. 30, 2007

(51) Int. Cl.
*H04N 3/22* (2006.01)
*H04N 3/23* (2006.01)

(52) U.S. Cl. .................. 348/806; 315/370; 315/371

(58) Field of Classification Search .......... 348/806, 348/807, 745–747, 626; 315/368.11, 370, 315/371
See application file for complete search history.

(56) References Cited

U.S. PATENT DOCUMENTS

| | | | | |
|---|---|---|---|---|
| 5,583,581 A | * | 12/1996 | Adachi et al. | 348/806 |
| 5,831,398 A | * | 11/1998 | Kim | 315/371 |
| 6,297,861 B1 | * | 10/2001 | Jo | 348/806 |
| 6,424,103 B2 | * | 7/2002 | Shibata | 315/370 |

* cited by examiner

*Primary Examiner*—M. Lee
(74) *Attorney, Agent, or Firm*—Marger Johnson & McCollom, P.C.

(57) ABSTRACT

We describe a device and an associated method that includes an EHT signal processing module to generate a compensated gain signal responsive to a first EHT signal. A field fly-back processing module generates a first correcting signal responsive to a first VFB signal. A horizontal scanning correction module generates a predistortion signal responsive to the compensated gain signal. A first digital to analog conversion module converts the predistortion signal into a corresponding analog predistortion signal. A field scanning correction module generates a correcting wave responsive to the compensated gain signal and the first correcting signal. A pulse width modulated module generates a modulated correcting wave by pulse width modulating the correcting wave. A power amplification module generates an amplified modulated correcting wave by amplifying the modulated correcting wave. And a cathode ray tube displays an image responsive to the analog predistortion signal and the amplified modulated correcting wave.

18 Claims, 6 Drawing Sheets

DEVICE AND METHOD FOR CORRECTING KINESCOPE SCAN DISTORTION

This application claims priority from Chinese patent application no. 2005 1 0111086.6 filed on Dec. 2, 2005, the disclosure of which we incorporate by reference.

FIELD

The present invention relates to a device and method for correcting kinescope scan distortion and, more particularly, to a device and method for correcting kinescope scan distortion using digital signal processing.

BACKGROUND

Cathode ray tubes (CRTs) may display raster images having non-linear and geometric distortion. This is because the CRTs create asymmetrical coil deflection by introducing non-linear and geometric distortion of the current field and horizontal scans.

To overcome the non-linear and geometric distortion, some devices predistort the image such that the CRTs display the predistorted image without distortion. These devices often change the field and horizontal scanning voltage wave using analog circuitry. More precisely, these processing devices change the current in the deflection coil according to a predistortion wave voltage. For example, a parabolic predistortion wave voltage may correct pincushion distortion, an exponential predistortion wave voltage may correct non-linear distortion, and an S predistortion wave voltage may correct extension distortion.

But these devices' analog circuitry often does not sufficiently improve image quality for advanced, multiple mode, digital televisions. Not only are these devices' analog circuitry ineffective at significantly reducing distortion, they are complex, costly, and consume large amounts of power.

SUMMARY

We describe a device including an EHT signal processing module to generate a compensated gain signal responsive to a first EHT signal. A field fly-back processing module generates a first correcting signal responsive to a first VFB signal. A horizontal scanning correction module generates a predistortion signal responsive to the compensated gain signal. A first digital to analog conversion module converts the predistortion signal into a corresponding analog predistortion signal. A field scanning correction module generates a correcting wave responsive to the compensated gain signal and the first correcting signal. A pulse width modulated module generates a modulated correcting wave by pulse width modulating the correcting wave. A power amplification module generates an amplified modulated correcting wave by amplifying the modulated correcting wave. And a cathode ray tube displays an image responsive to the analog predistortion signal and the amplified modulated correcting wave.

We describe a method including generating a compensated gain signal responsive to a first EHT signal, generating a first correcting signal responsive to a first VFB signal, and generating a predistortion signal responsive to the compensated gain signal. The method further includes converting the predistortion signal into a corresponding analog predistortion signal, generating a correcting wave responsive to the compensated gain signal and the first correcting signal, generating a modulated correcting wave by pulse width modulating the correcting wave, and generating an amplified modulated correcting wave by amplifying the modulated correcting wave. And the method includes displaying an image responsive to the analog predistortion signal and the amplified modulated correcting wave.

DETAILED DESCRIPTION

We describe a device and associated method that compensates for the distortion of the image caused by line scan. The device predistorts the image using a correcting voltage.

Figure 1:
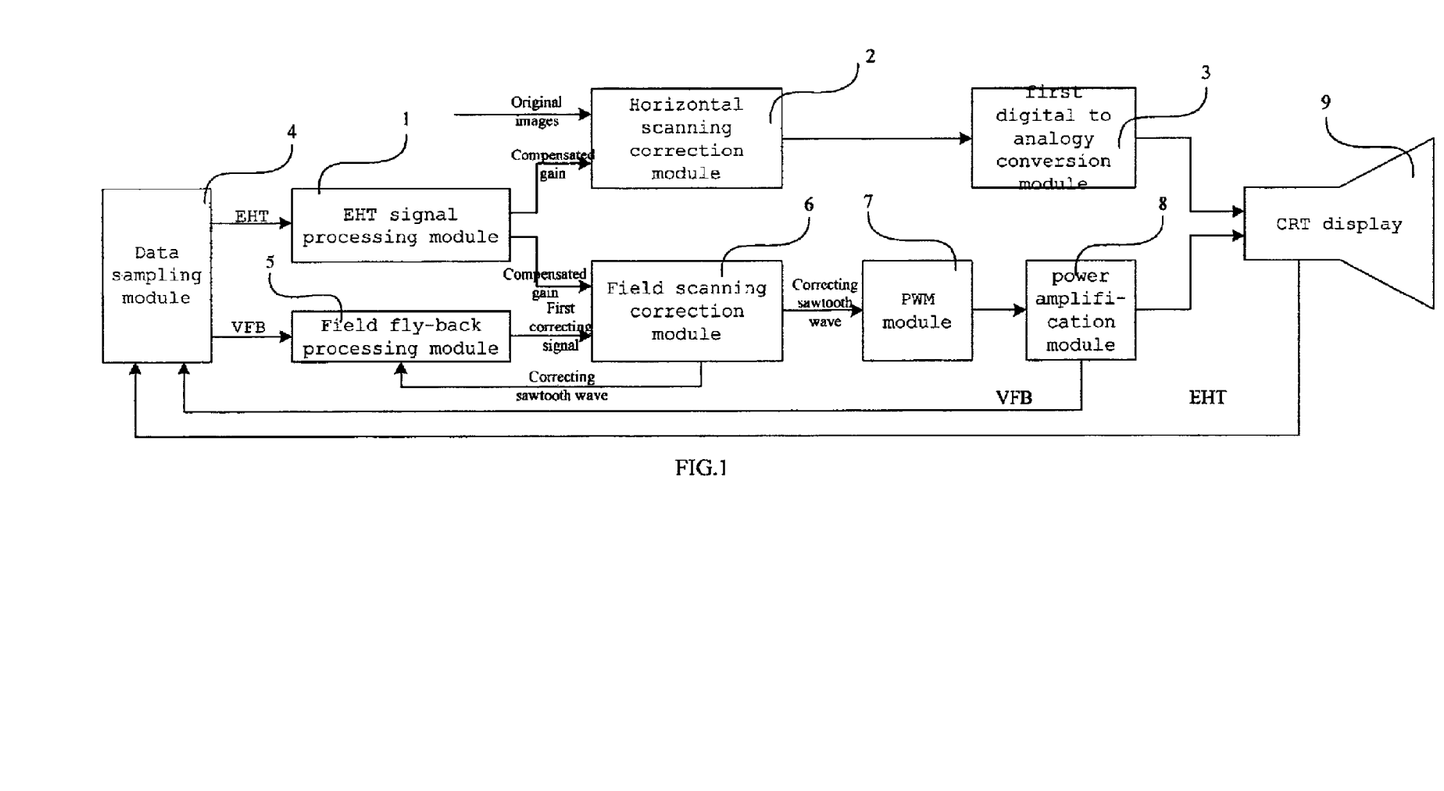
FIG. 1 is a block diagram of an embodiment of a device for correcting kinescope scan distortion.

FIG. 1 is a block diagram of an embodiment of a device for correcting kinescope scan distortion. Referring to FIG. 1, the device includes an extra high tension (EHT) signal processing module 1 coupled to a horizontal scanning correction module 2. A first digital to analog conversion module 3 is coupled to the horizontal scanning correction module 2 and a cathode ray tube (CRT) 9. A field fly back processing module 5 is coupled to data sampling module 4 and a field scanning correction module 6. The field scanning correction module 6 is coupled, in turn, to a pulse width modulating (PWM) module 7 and a power amplification module 8.

The EHT signal processing module 1 receives an EHT signal from the data sampling module 4. The EHT signal processing module 1 generates a compensated gain signal by processing the EHT signal. For simplicity, we describe the EHT signal processing module 1 as processing a singular EHT signal but a person of reasonable skill in the art should recognize that the EHT signal processing module 1 may process plural EHT signals.

In an embodiment, the EHT signal processing module 1 middle and low pass filters the EHT signal sampled by the data sampling module 4 to reduce the noise and smooth the signal. The EHT signal processing module 1 may low pass filter the EHT signal to obtain at least three compensated gain signals, providing at least two compensated gain signals to the horizontal scanning correction module 2 and providing at least another compensated gain signal to the field scanning correction module 6.

In an embodiment, the EHT signal processing module 1 generates the compensated gain signal by eliminating the maximum and minimum EHT signals sampled by the data sampling module 4, averaging the remaining EHT signals, and low pass filtering the averaged EHT signals.

The horizontal scanning correction module 2 receives the compensated gain signal from the EHT signal processing module 1 as well as original image data. The horizontal scanning correction module 2 generates a predistortion signal responsive to the compensated gain signal.

In an embodiment, the horizontal scanning correction module 2 calculates pixel values according to the image data and the compensated gain signal provided by the EHT signal processing module 1.

The first digital to analog conversion module 3 converts the (digital) predistortion signal into an analog predistortion signal in any manner known to a person of reasonable skill in the art. The first digital to analog conversion module 3 provides the analog predistortion signal to the CRT display 9.

The field fly back processing module 5 receives a VFB signal from the data sampling module 4. The field fly back processing module 5 generates a first correcting signal responsive to the VFB signal. For simplicity, we describe the field fly back processing module 5 as processing a singular VFB signal but a person of reasonable skill in the art should recognize that the field fly back processing module 5 may process plural VFB signals.

In an embodiment, the field fly back processing module 5 compares the field fly back VFB signal with a correcting wave, e.g., a correcting saw tooth wave, generated by the field scanning correction module 6. The field fly back VFB signal corrects the center position and the amplitude of the correcting wave.

The field scanning correction module 6 generates a correcting wave responsive to the compensated gain signal received from the EHT signal processing module 1 and responsive to the first correcting signal received from the field fly back processing module 5. The correcting wave may be a saw tooth wave in an embodiment.

The PWM module 7 pulse width modulates the correcting wave in any manner known to a person of reasonable skill in the art. And the power amplification module 8 amplifies, e.g., the power, of the pulse width modulated correcting wave in any manner known to a person of reasonable skill in the art. The power amplification module 8 provides the amplified modulated correcting wave to the CRT display 9. More precisely, the power amplification module 8 provides the amplified modulated correcting wave to the field-bias loops of the CRT display 9 for correcting field distortion.

The CRT 9 displays an undistorted image responsive to the analog predistortion signal and the amplified modulated correcting wave. The CRT 9 displays the undistorted image in any manner known to a person of reasonable skill in the art.

The data sampling module 4 extracts the EHT signal from the CRT display 9 and provides them to the EHT signal processing module 1. The data sampling module 4 extracts a field fly back signal VFB from the power amplification module 8 and provides it to the field fly back processing module 5. In this manner, the data sampling module 4 generates the EHT and VFB signal that it then provides to the EHT signal and field fly back processing modules 1 and 5, respectively.

Figure 2:
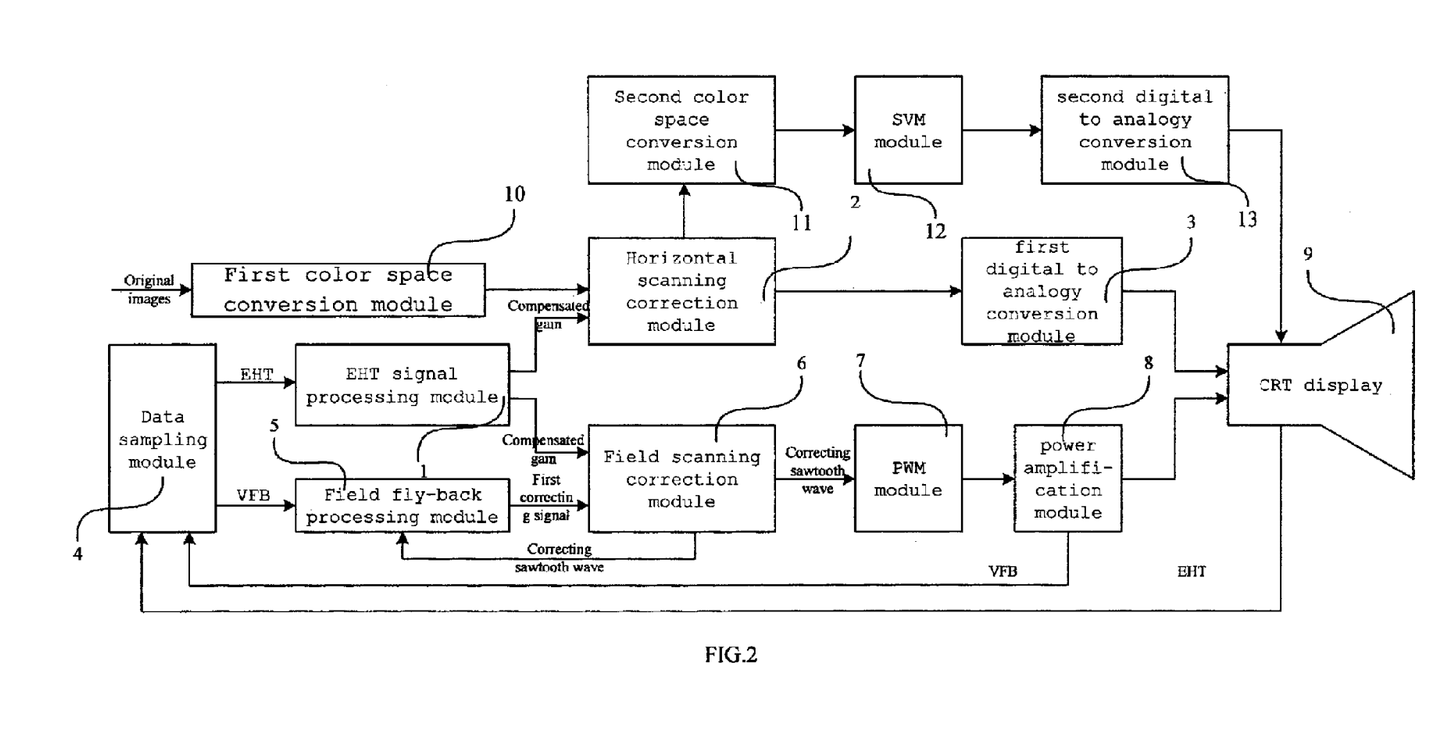
FIG. 2 is a block diagram of an embodiment of a device correcting kinescope scan distortion.

FIG. 2 is a block diagram of an embodiment of a device correcting kinescope scan distortion. Referring to FIGS. 1-2, a first color space conversion module 10 converts the original image data from a first color space to a second color space, e.g., from YUV to RGB color spaces. A second color space conversion module 11 converts image signals from the second color space to the first color space, e.g., from RGB to YUV color spaces. A scan velocity modulation (SVM) module 12 modulates the scan velocity of the color space converted signals (e.g., YUV signals) output from the second color space conversion module 11. A second digital to analog conversion module 13 converts the (digital) SVM modulated signals output from the SVM module 12 into analog SVM signals. The second digital to analog conversion module 13 provides the analog SVM signals to the CRT 9 to control the scan velocity.

All other modules shown in FIG. 2 operate substantially similarly as those corresponding modules shown in FIG. 1.

In an embodiment, the first color space conversion module 10 converts the image signals in the YUV color space into image signals in the RGB color space and send the RGB image signals to the horizontal scanning correction module 2. The horizontal scanning correction module 2, in turn, outputs corrected image signals responsive to the compensated gain signal generated by the EHT signal processing module 1.

In an embodiment, the second color space conversion module 11 converts the compensated RGB image signals from the horizontal scanning correction module 2 into compensated YUV image signals. The second color space conversion module 11 provides the compensated YUV image signals to the SVM module 12 that, in turn, provides the SVM signals to the second digital to analog conversion module 13. The second digital to analog conversion module 13 provides the converted analog signals to the CRT 9 for controlling horizontal scan velocity.

Figure 3:
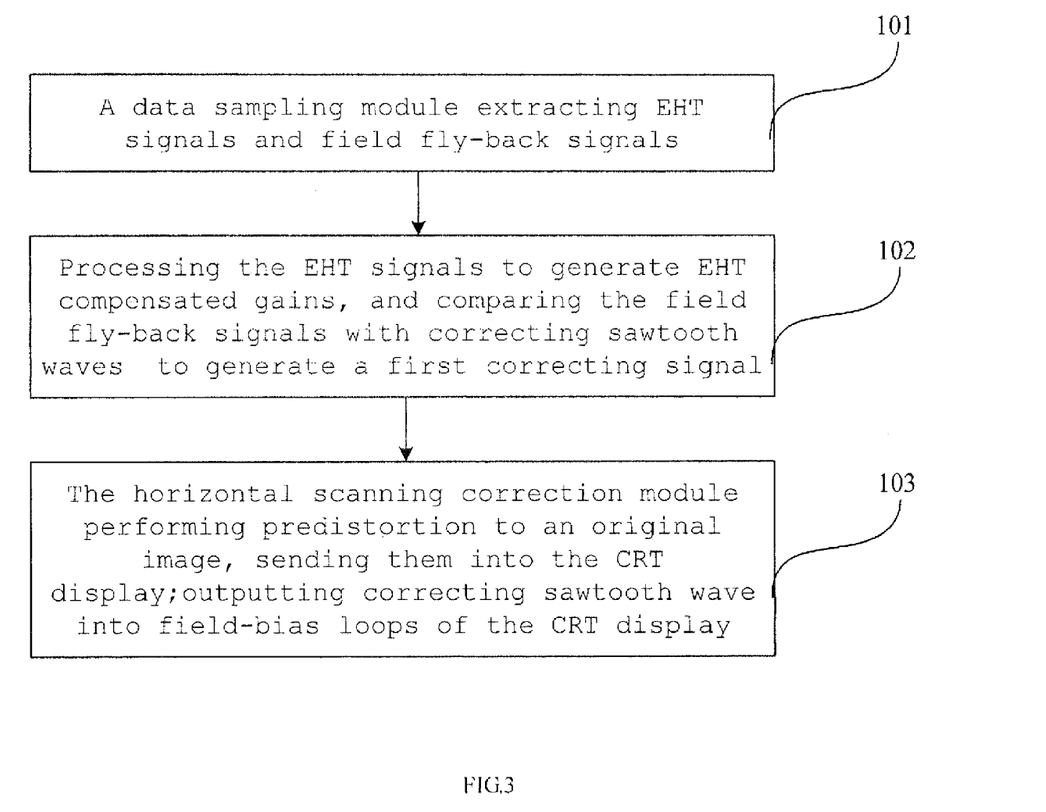
FIG. 3 is a flowchart of an embodiment of a method for correcting kinescope scan distortion.

FIG. 3 is a flowchart of an embodiment of a method for correcting kinescope scan distortion. Referring to FIGS. 1-3, at 101, the method extracts an EHT signal from the CRT 9 and a VFB signal from the power amplification module. At 102, the method processes the EHT signal to generate a compensated gain signal that it provides to the horizontal scanning correction module 2 and the field scanning correction module 6. And the method compares the field fly back VFB signal with a correcting saw tooth wave to generate a first correcting signal that it provides to the field scanning correction module 6. At 103, the method predistorts an original image responsive to the compensated gain and other predetermined correcting values before sending it to the CRT 9 for display and outputs a correcting saw tooth wave to the field bias loops of the CRT 9. In an embodiment, the correcting saw tooth wave may be generated based on the EHT compensated gains and the first correcting signal and may be pulse width modulated and power amplified prior to the CRT 9. Therefore, the predistortion of the images are used to compensate the distortion of the images caused by the horizontal scan, and the correcting saw tooth waves are added on the field-bias loops of the CRT display to correct the non-linear distortion of field scan.

Figure 4:
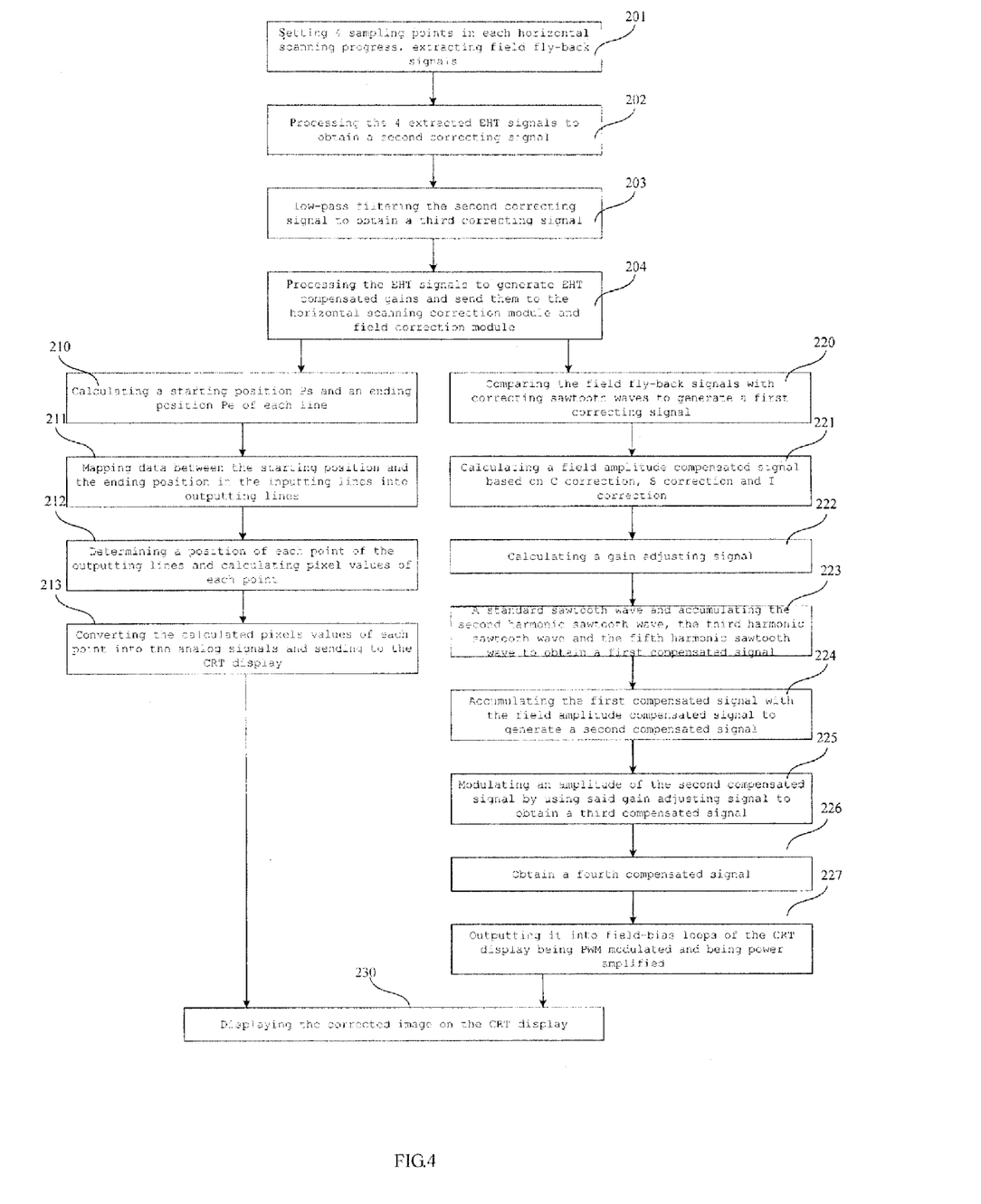
FIG. 4 is a flowchart of an embodiment of a method for correcting kinescope scan distortion.

FIG. 4 is a flowchart of an embodiment of a method for correcting kinescope scan distortion. Referring to FIGS. 1-4, at 201, the method sets a plurality of sampling points, e.g., 4 sampling points, in each horizontal scan. The data sampling module 4 extracts an EHT signal each sampling point during each horizontal scan. The method sends the extracted EHT signals to the EHT signal processing module 1. Also at 201, the method extracts field fly back signals from the power amplification module 8 and provides them to the field fly back processing module 5.

At 202, the method processes the plurality of EHT signals sampled in each horizontal scan to generate a second correcting signal. In an embodiment, the EHT signal processing module 1 generates the second correcting signal by eliminating the maximum and minimum EHT signals sampled by the data sampling module 4, averaging the remaining EHT signals, and low pass filtering the averaged EHT signals to obtain the third correcting signal (at 203).

At 204, the method obtains a left edge EHT compensated gain by calculating the third correcting signal and a left edge EHT compensated center value, providing both to the horizontal scanning correcting module 6 for correcting a left edge distortion. And the method obtains a right edge EHT compensated gain by calculating the third correcting signal and a right edge EHT compensated center value, providing both to the horizontal scanning correcting module 6 for correcting a right edge distortion.

At 210, the method calculates a starting position Ps and an ending position Pe for each input line of the image data according to the compensated gain signal and/or other predefined values. These predefined values may include image position, image size, keystone distortion, pincushion distortion, pincushion S distortion, pincushion W distortion, corner distortion, EHT distortion, and the like.

Figure 5:
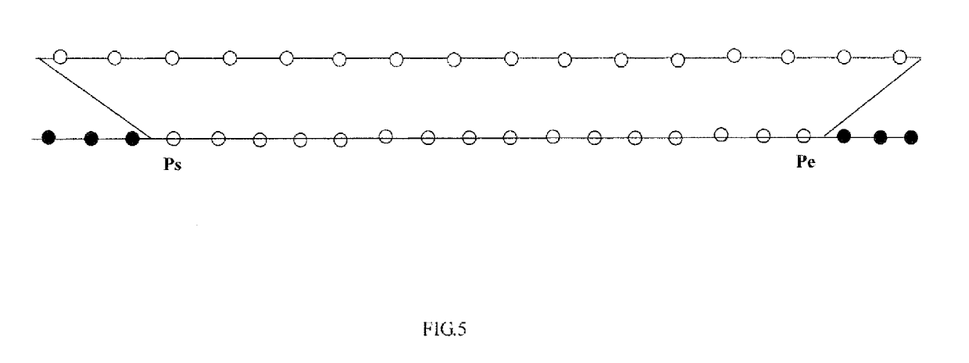
FIG. 5 is an illustration of an embodiment mapping relationship between input and output line data.

At 211, the method maps the starting position Ps and the ending position Pe to the input and output lines as shown for example in FIG. 5. Referring to FIG. 5, maps the relationship between the starting and ending positions of input lines into the starting and ending positions of output lines.

At 212, the method determines a position of each point of the output lines and calculates a pixel value of each point.

At 213, the method converts the calculated pixel values of each point into analog signals and sends them to the CRT display 9.

CRT kinescopes exhibit horizon ledge as well as S and non-linear distortion. To reduce distortion, image data is mapped into a prescribed output scope by the method we describe above. Doing so results in non-symmetrical distribution of the output positions relative to the image data. The non-symmetrical distribution determines the correcting values of the S and non-linear distortion so the mapping between the input and output involves the image edge distortion and distortion inside the images.

After the method determines the position of each output point, a multiple-phase filter may be used to calculate the pixel value of each point. For a given input image, the points of each line are same, while the points of each line of the processed output image are different from the given input image. To keep the pixel luminance unchanged, the ratio of the input and the output is set as the weight of the output pixel value of each point.

The method corrects the image but not necessarily the actual output raster. To completely fill the screen with the image, the scan raster of each line must be at least larger than the screen's width. The scan raster of the CRT kinescope 9 is larger than the center of the screen in four corners of the screen such that the four corners of the screen will appear over scan.

Figure 6:
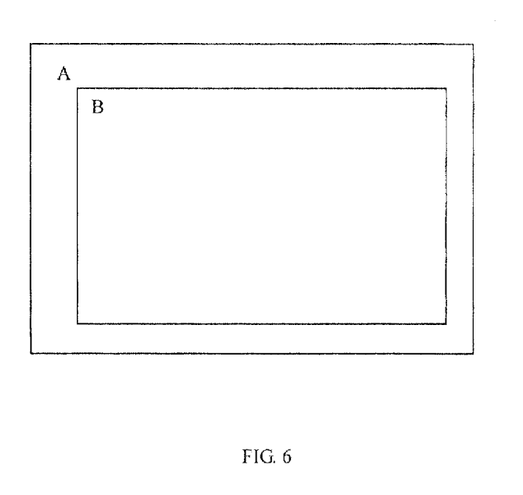
FIG. 6 is a drawing of an embodiment of an image displaying area of the processing method for correcting kinescope scan distortion.

FIG. 6 is a drawing of an embodiment of the scan raster and the image displaying area of the method we describe above. Referring to FIGS. 1-6, an area A is over a scan area, an area B is a displaying area of the image, and an area C area is the edge of the scan grating. A long scan time will destroy or at least lower the useful life of the CRT kinescope. An over scan will amplify the power requirements of the CRT kinescope. To avoid the over scan, the area outside of the starting position and ending position Ps and Pe, respectively, of each line is set as the blanking interval.

At 220, the method generates a first correcting signal by comparing the field fly back signals with the correcting saw tooth wave generated by the field scanning correction module 6. The method provides the first correcting signal to the field scanning correction module 6.

At 221, the method calculates a field amplitude compensated signal based on C, S, and I corrections.

At 222, the method calculates a gain adjusting signal based the field amplitude compensated signal, the EHT compensated gain, the first correcting signal, and the field amplitude signal.

At 223, the method generates a standard saw tooth wave and accumulates the second, third, and fifth harmonic saw tooth wave to obtain a first compensated signal.

At 224, the method accumulates the first compensated signal with the field amplitude compensated signal to generate the second compensated signal.

At 225, the method modulates an amplitude of the second compensated signal by using the gain adjusting signal to obtain a third compensated signal.

At 226, the method offsets the center of the third compensated signal based on a define field center correction, Moore correction, and/or a modified signal to obtain a fourth compensated signal.

If the power of harmonic wave of the standard saw tooth wave is directly used, the deviation will appear on the position and the amplitude. So the modification is needed to the amplitude and the center position of the saw tooth wave. Accumulating a small value in the odd or even field to realize the correction of vertical color and adjusting the fourth compensated signal according to a clock number of each line guarantees an unchanged occupation ratio of output signal by the pulse modulation module under different formats.

At 227, the method pulse width modulates and power amplifies the fourth compensated signal and provides it to the field bias loops of the CRT display.

At 230, the method displays an undistorted image.

If the color space of the original image is not in the RGB color space but the YUV color space, then the color space conversion module 13 converts the YUV color space into the RGB color space.

Figure 7:
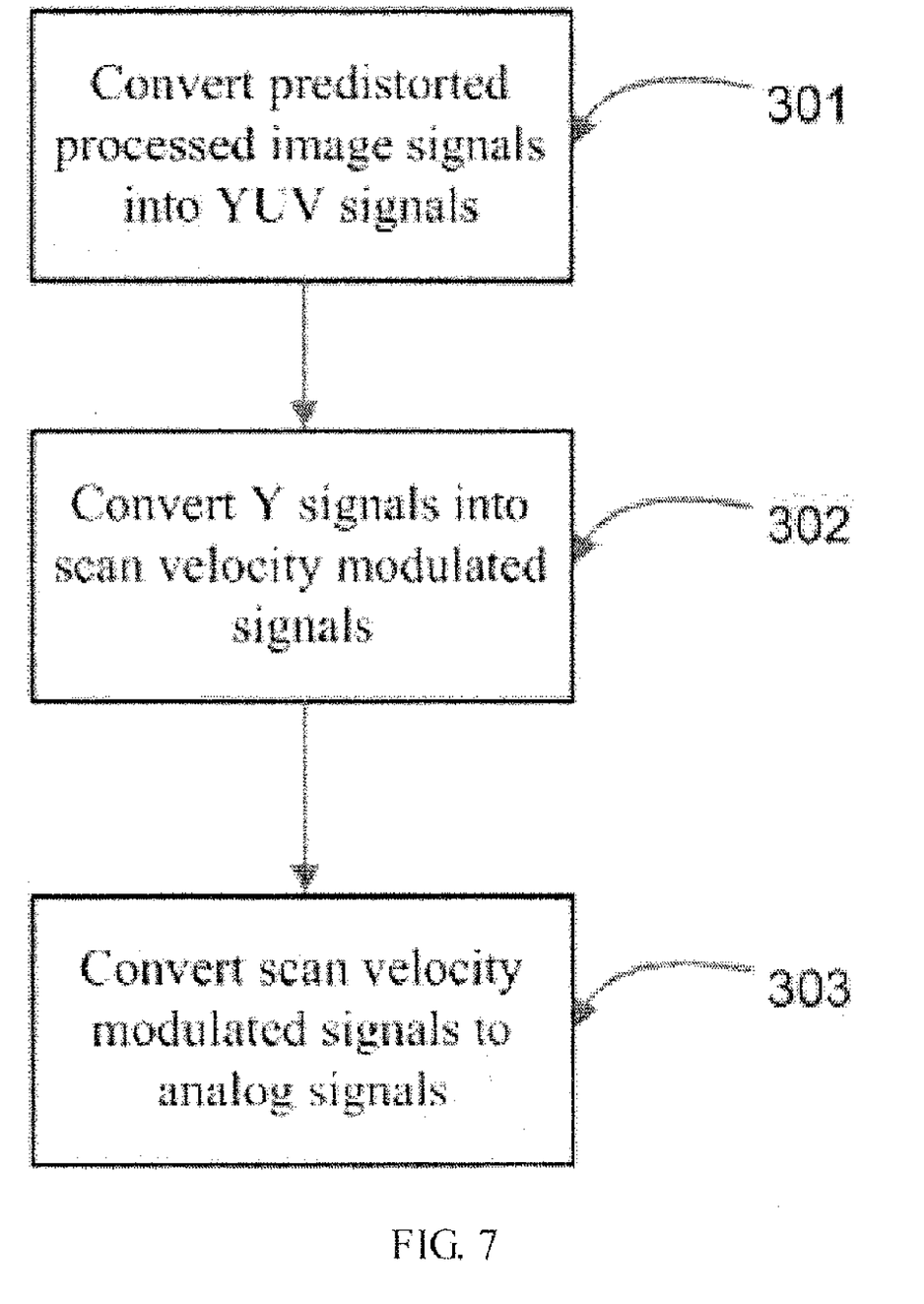
FIG. 7 is a flowchart of an embodiment of a method for controlling line scan velocity.

FIG. 7 is a flowchart of an embodiment of a method for controlling line scan velocity. Referring to FIGS. 1-7, after 212 and at 301, the method converts the predistorted processed image into YUV signals.

At 302, the method converts Y signals into the scan velocity modulated signals.

At 303, the method converts the scan velocity modulated signals into the analog signals and provides them to the CRT 9 for controlling the line (horizontal) scan velocity.

We describe a method for correcting kinescope scan distortion using the predistortion voltage waves to correct the non-linear field distortion that compensates for the distortion caused by the horizontal scan, producing high quality and smooth corrected images in big scopes such as those used in advanced televisions.

The example embodiments we describe above are only to explain, but not to limit the present. Various modifications, changes, or equivalent replacements can be made by those skilled in the art without departing from the spirit and scope of the following claims despite the detailed description that refers to example embodiments.

We claim:

1. A device comprising:
    an EHT signal processing module to generate a compensated gain signal responsive to a first EHT signal;
    a horizontal scanning correction module to generate a predistortion signal responsive to the compensated gain signal;
    a first digital to analog conversion module to convert the predistortion signal into a corresponding analog predistortion signal;
    a field fly-back processing module to generate a first correcting signal responsive to a first VFB signal;
    a field scanning correction module to generate a correcting wave responsive to the compensated gain signal and the first correcting signal;

a pulse width modulated module to generate a modulated correcting wave by pulse width modulating the correcting wave;

a power amplification module to generate an amplified modulated correcting wave by amplifying the modulated correcting wave; and a cathode ray tube to display an image responsive to the analog predistortion signal and the amplified modulated correcting wave.

2. The device of claim 1 comprising:

a data sampling module to generate the EHT and VFB signals by sampling a second VFB signal output from the power amplification module and a second EHT signal output from the cathode ray tube.

3. The device of claim 1 comprising:

a first color space conversion module to generate a first color space converted signal responsive to image data; and where the horizontal scanning correction module is adapted to operate responsive to the first color space converted signal.

4. The device of claim 3 where the first color space conversion module is adapted to generate the first color space converted signal by converting YUV image data into an RGB signal.

5. The device of claim 3 comprising:

a second color space conversion module to generate a second color space converted signal responsive to an RGB signal generated by the horizontal scanning correction module; and where the horizontal scanning correction module is adapted to operate responsive to the second color space converted signal.

6. The device of claim 5 where the second color space conversion module is adapted to generate the second color space converted signal by converting the RGB signal into a YUV signal.

7. The device of claim 5 comprising:

a scan velocity modulation module to modulate the second color space converted signal into a scan velocity modulation signal.

8. The device of claim 7 comprising:

a second digital to analog conversion module to convert the scan velocity modulation signal into a corresponding analog scan velocity modulation signal.

9. A method comprising:

generating a compensated gain signal responsive to a first EHT signal;

generating a first correcting signal responsive to a first VFB signal;

generating a predistortion signal responsive to the compensated gain signal;

converting the predistortion signal into a corresponding analog predistortion signal;

generating a correcting wave responsive to the compensated gain signal and the first correcting signal;

generating a modulated correcting wave by pulse width modulating the correcting wave;

generating an amplified modulated correcting wave by amplifying the modulated correcting wave; and displaying an image responsive to the analog predistortion signal and the amplified modulated correcting wave.

10. The method of claim 9 comprising:

generating the EHT and VFB signals by sampling a second VFB signal output from the power amplification module and by sampling a second EHT signal output from the cathode ray tube.

11. The method of claim 9 comprising:

generating a first color space converted signal responsive to image data; and generating the compensated gain signal responsive to the first color space converted signal.

12. The method of claim 11 where generating the first color space converted signal includes converting YUV image data into an RGB signal.

13. The method of claim 11 comprising:

generating a second color space converted signal responsive to an RGB signal generated by the horizontal scanning correction module; and generating the compensated gain signal responsive to the second color space converted signal.

14. The method of claim 13 where generating the second color space converted signal includes converting the RGB signal into a YUV signal.

15. The method of claim 13 comprising:

modulating the second color space converted signal into a scan velocity modulation signal.

16. The method of claim 15 comprising:

converting the scan velocity modulation signal into a corresponding analog scan velocity modulation signal.

17. A method comprising:

extracting EHT and field fly back signals;

generating a compensated gain signal responsive the EHT signal;

generating a first correcting signal responsive to comparing the field fly back signal and a correcting wave signal;

generating the correcting wave signal responsive to the compensated gain signal and the first correcting signal;

generating a predistortion signal by processing image data with the compensated gain signal;

converting the predistortion signal into an analog predistortion signal;

modulating the correcting wave signal;

amplifying the correcting wave signal; and displaying an undistorted image by processing the analog predistortion signal and the amplified correcting wave signal.

18. The method of claim 17 comprising:

converting the image data from a first color space to a second color space before generating the predistortion signal;

converting the predistortion signal from the second color space to the first color space; and modulating the converted predistortion signal in the first color space.

* * * * *